May 17, 1960 E. A. ROCKWELL 2,936,590
POWER COMPOUND BOOSTER FOR BRAKES
Filed Dec. 8, 1954 3 Sheets-Sheet 1

INVENTOR
Edward A. Rockwell
BY
Arthur Wright
ATTORNEY

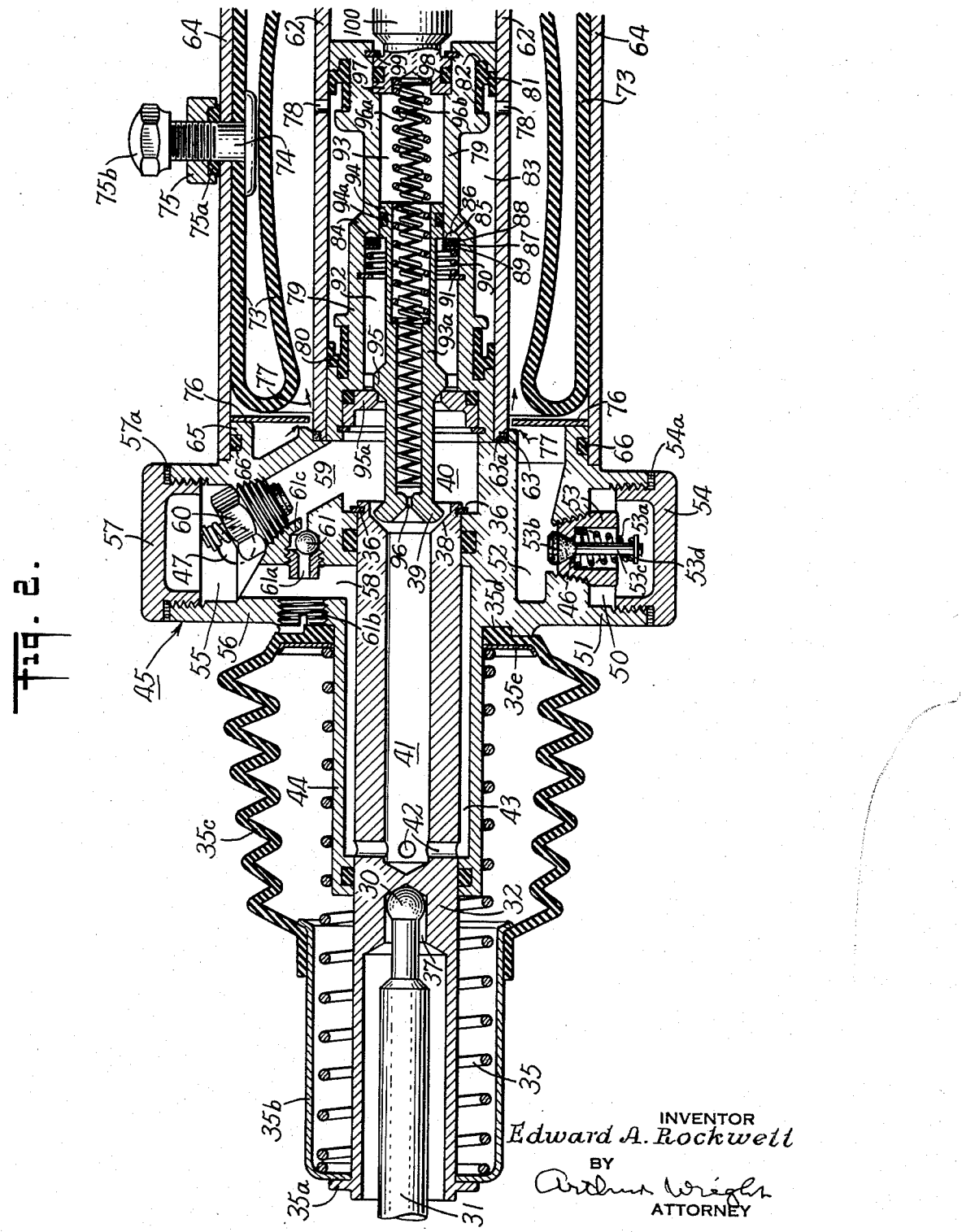

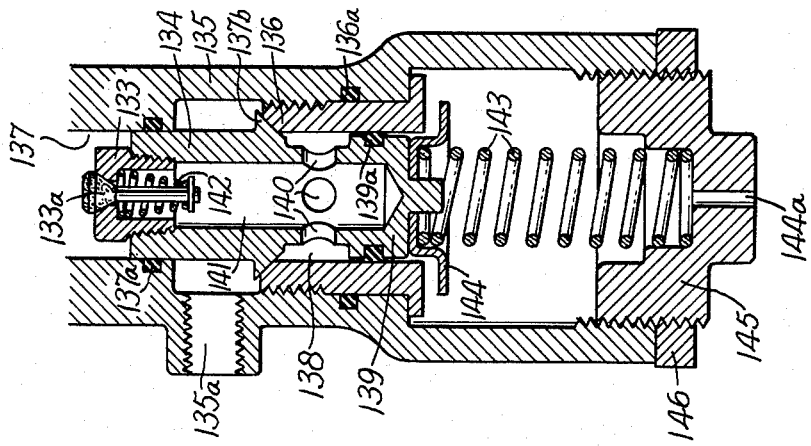
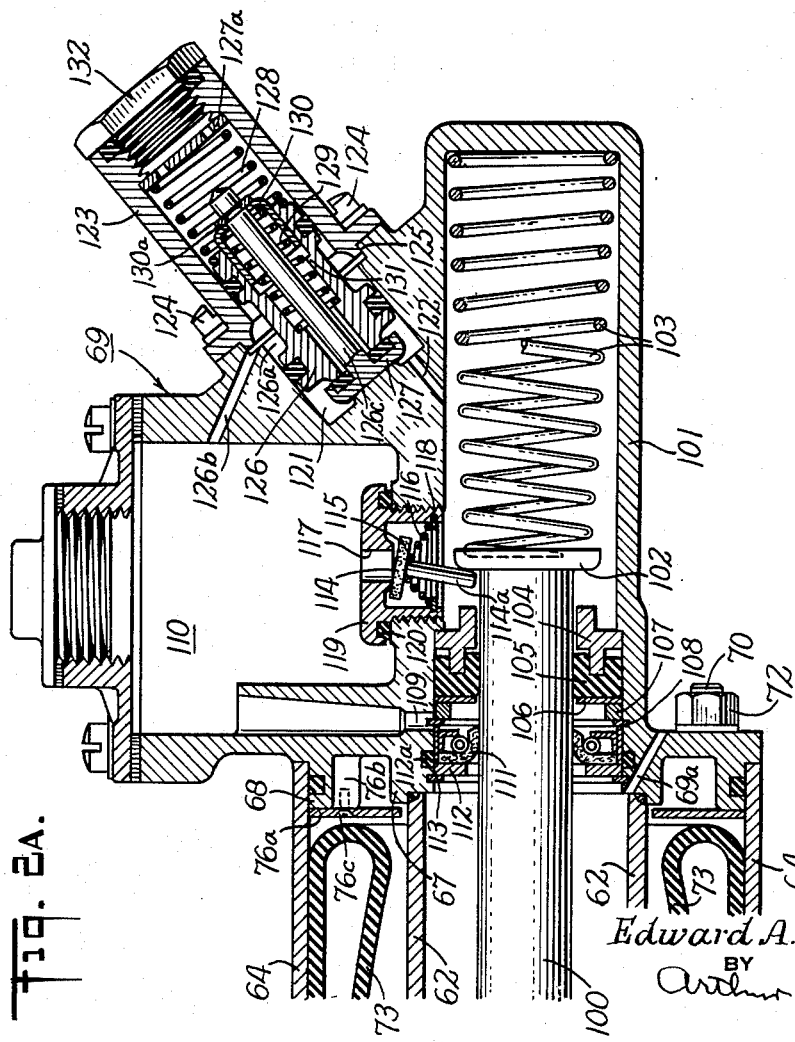

United States Patent Office 2,936,590
Patented May 17, 1960

2,936,590

POWER COMPOUND BOOSTER FOR BRAKES

Edward A. Rockwell, Los Angeles, Calif.

Application December 8, 1954, Serial No. 473,884

12 Claims. (Cl. 60—54.6)

My invention relates particularly to hydraulic power units which are adapted to deliver power for work performance generally, but which also have special application for the delivery and control of hydraulic pressure fluid, for instance in the actuation of automobile brakes.

An object of my invention is to coordinate certain of the elements of my previously issued U.S. patents into an improved construction, wherein a new and useful result is achieved, hereinafter made apparent, especially in connection with the utilization of the hydraulic power available from the current automatic transmissions, the said patents being as follows:

No. 2,300,136, dated October 27, 1942
No. 2,311,576, dated February 16, 1943
No. 2,418,667, dated April 8, 1947
No. 2,505,578, dated April 25, 1950
No. 2,573,277, dated October 30, 1951
No. 2,593,192, dated April 15, 1952

A further important object obtained with certain of said elements results in a performance characteristic which provides an early "cut-in" in the power boost through the service range of operation of the brakes, requiring a relatively short range of movement and light forces applied to the control treadle, after which a higher range of pressure can be obtained by a compound manual boost, through a smooth transition from the power boost to manual boost, but at substantially higher manual treadle forces, including also a dash-pot action of the control valve to prevent brake "shock" during fast brake applications.

A further object is to provide a follow-up valve apparatus having a power manual run-out feature available for operation even when the power pressure is inadequate or fails to act, whereby a top range of pressure can be obtained manually by increased travel of the manual control means under emergency conditions of operation.

A related object is to provide a pedal operated booster having a two stage boost: a first stage power boost until the pressure limit of the source or run-out is reached, and a second stage manual hydraulic boost after run-out wherein the boost after run-out ratio is substantially the same as the boost ratio as run-out is approached.

A further object embodied in the arrangement permits the utilization of a relatively shorter range of travel of the manual means, than otherwise would be feasible for a given output volume and pressure requirement.

A further object is to construct a check valve and "snifter" air bleeder, insuring the positive solid operation of the compound manual booster feature of my invention.

A further object is in the relationship of the parts forming a combined accumulator booster and valve device, in order that the lag of operation by the hydraulic pressure fluid from the transmission will be at a minimum.

A further object is to provide a check valve and mounting located in the valve and booster piston, in order to obtain a manual booster specific pressure greater than the specific power pressure.

A further object is in the use of a slack adjuster coordinated with the manual compound booster to insure a relatively uniform pedal range in the operation thereof, as well as for reducing the entire volume necessary in setting the brakes without requiring undue manual force in the initial stage, in case of power failure for any reason.

A further object is to provide an emergency pedal which preferably has an increased leverage as compared to the leverage of the treadle, with ample stroke to provide a maximum desired range of movement by merely manual means, such for example as in case of brake linings becoming wet or failing.

An important further object is to conserve the power pressure and volume required, so as not to cause any malfunction of the automatic transmission to which the booster is connected, in a compact and simple device which can be readily installed on passenger automobiles. It will be apparent from the specification, and in the drawings, described hereinafter, that in the case of the booster unit operating as a system utilizing the automatic tranmsission pressure fluid, it is an important object to utilize only that part of the available pressure range of fluid sufficient to provide an early power boost cut-in, for counterbalancing the initial spring forces in the brake system, and to provide a substantial power force for engaging the brake shoes. After this, a compound action is produced by the trapped transmission fluid which is only manually pressurized for the complete brake action, and this sequence of operation is effected without any "jump" in the operation, as the power pressure utilized in the initial stage of operation is equal to the manual pressure but at increased volume of the booster piston displacement.

This action resulting from the coordination herein described makes possible the utilization of the automatic transmission pressures, especially in those systems which alter the pump pressures between a wide range of minimum and maximum. In such systems a pressure limiting valve can be installed in the pressure line from the transmission and adjusted to the minimum level so as to maintain a uniform pedal force to brake pressures in the operation thereof. Such a pressure limiting valve is disclosed in my U.S. Patent No. 2,636,511, dated April 28, 1953.

It will be evident also, that due to the variation of pressures from the source and in the case of motor failure, the use of an accumulator is desirable, especially for fast operation, and to this end I have incorporated herein an accumulator located adjacent to the booster cylinder and piston so as to avoid excessive lag during fast application of the brakes. Also, in connection with the annular tubular type of accumulator disclosed herein, a substantial volume can be maintained while at the same time keeping the dimensions of the unit within bounds, for ready installation without interference with the adjacent parts of the automobile.

From the above, it will be apparent that many advantages are thus secured, making for greater safety and dependability over other types of power brakes currently used on passenger cars of the vacuum type. In accordance with the present invention, the source of pressure fluid is practically always available even when the engine is dead, as the automatic transmission has two pumps, one driven by the engine and the other driven by the propeller shaft. In the vacuum type, the vacuum may become low in climbing grades and, then, if the motor should stall there would be no additional boost available for securing maximum braking, especially when a low range treadle is used. Also, in accordance with my invention the oil pressure serves to lubricate the parts so as to make for efficient operation, and lighter return springs can be used, making for more efficient manual operation.

The sequential operation of limited power and compound boost give a smooth and dependable operation having a maximum controllable "feel." All of this is more fully described in connection with the drawings, hereinafter.

While my invention is capable of embodiment in many different forms, for the purpose of illustration I have shown only certain forms thereof in the accompanying drawings, in which—

Figs. 2 and 2A are vertical sections of the said booster unit;

Fig. 4 is an alternative form of an improved maximum pressure control valve of a type relating to the disclosure in my Patent No. 2,636,511 aforesaid, in which I have shown the valve in connection with a booster-housing in a fragmentary vertical section of Fig. 2A.

Figure 1:
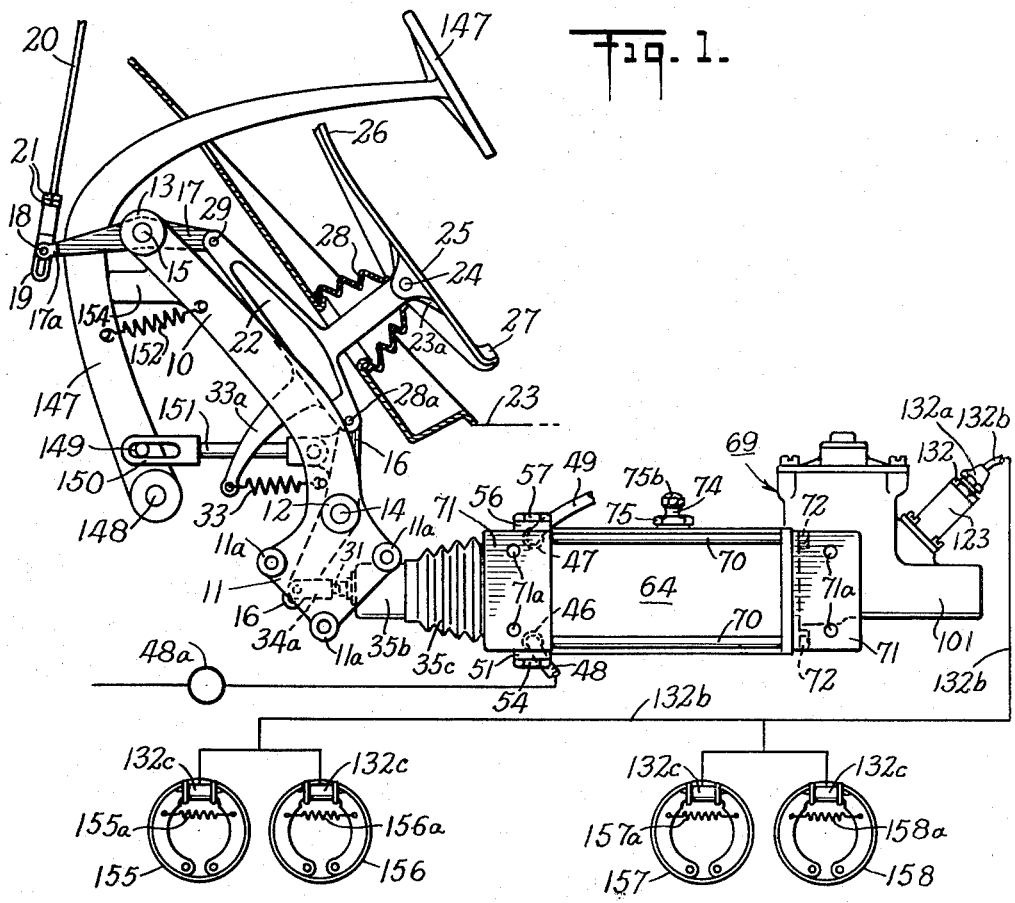
Fig. 1 is a side elevation of the booster unit adapted for mounting on the frame of the vehicle, and showing the relationship of the accelerator and brake control mounted substantially flush with the floor board of the vehicle, and with the bracket mounting for the control linkage being adapted for mounting on the automobile frame.

As shown in the drawings, I have provided a fulcrum bracket support 10, having a triangular base 11 with three bosses 11a for bolts, adapted for mounting on the frame of an automobile.

At opposite ends of the bracket 10 and on the other side thereof from the bosses 11a are bosses 12 and 13 for the support of fulcrum pins 14 and 15, respectively. Upon these pins are pivoted, respectively, a brake-actuating lever 16 and a throttle lever 17, the latter having a yoke 17a and clevis pin 18, for coaction with a slotted adjustable rod end 19 for operating a carburetor throttle rod 20 fastened thereto. This rod 20 is a part of the usual throttle linkage having a light return spring for returning the carbureter throttle to stop (not shown). The slotted rod end 19 is adjusted so that the pin 18 is slightly free from the upper end of said slot, and lock nuts 21 are provided to lock the rod 19 at this point of adjustment to the throttle rod 20. An arm of a T-shaped member 22, pivoted to the lever 16, protrudes through an opening in an apertured floor board member 23 and has a substantially flat enlarged end 23a to which there is secured by a pin 24 a treadle 25 having a toe portion 26 and a heel portion 27. A flexible boot 28 covers the opening in the floor board 23, as shown in Fig. 1.

It will be noted that the lever arm 16, having a pivot 28a on the member 22, and the lever arm 17 form a three-bar linkage, and in the normal position thereof, shown in Fig. 1, force exerted upon the toe portion 26 of the treadle 25 will tend to depress a pivot 29 between the member 22 and the lever 17, whereby the lever 17, which can be normally operated, for instance, by the right foot, will rotate in a clockwise direction about the pivot pin 15 and hence move the rod 20 upwardly for opening the throttle, after first taking up any slight adjusted clearance between the pin 18 and the slot in the rod 19. This action will move the lever 16 in a clockwise direction only slightly and result in a slight lifting of the heel portion 27 of the treadle 25. As shown in Figs. 1 and 2, a spherical end 30 of a push rod 31 which is pivoted to the lower end of the lever 16, is held against the socket end of a brake control plunger 32 in a fixed position in the initial position shown, due to the force of a pullback spring 33, connected to an arm 33a on the member 22, and its reaction bracket 34 mounted on the support 10, tending to rotate the lever 16 in a counter-clockwise direction, which tendency is stopped, however, by a clevis adjustable connection at 34a fastened to the push rod 31. A return extension spring 35 seated by a flange 35a located on the plunger 32 requires a slightly greater force than the counterbalanced force applied by the spring 33 to move it from its initial stop position away from the stop of a snap ring 36 at the right end of the plunger 32. There is a spring retainer cup 35b and a rubber boot 35c, fastened against an end housing 45, hereinafter referred to, in a groove 35d therein, in which the boot 35c at this junction is held by a spring plate 35e.

It will thus be apparent that the previously described movement of the treadle to operate the throttle will cause the rod end 30 to move away from the push rod socket and will freely oscillate in a socket bore at 37, which can be provided with sufficient length for this lost motion action. It will be also apparent that the adjusted rod length of the push rod 31 thus provides a stop for the three-bar linkage 16, 22, 17, and at this point there is only a slight clearance in the slot of the member 19, and that the throttle will be instantly responsive to the slightest movement of the treadle. Furthermore, since the spring 35 is partially counterbalanced by the action of the spring 33, very slight forces applied to the heel portion of the treadle 25 will cause the lever 16 to rotate in a counter-clockwise direction, and in this case the lever arm 17 will also rotate in a counter-clockwise direction to a slight extent and thus slightly lift the toe portion of the treadle 25. It is thus apparent that the action of the treadle is substantially the same as being over fixed pivots, shifting according to whether the brake or the accelerator is applied. Also, it is easier for the driver to apply force by the heel than by the toe as many drivers now do with standard brake arrangements. Furthermore, with the automatic transmission, no clutch pedal is used and there is at times a tendency for the automobile to "creep" at idle. With my arrangement the slightest depression of the heel portion of the treadle will prevent this "creep" and also be effective to hold the car on up-grades as the toe portion can be depressed without any substantial lag and the automobile will not roll-back in starting from a standing start.

While the general arrangement and function of this treadle 25 is disclosed in my U.S. Patent No. 1,907,009, dated May 2, 1933, and my Patent No. 2,300,136 aforesaid, there are features in this present invention which result in useful and important advantages for making feasible this mode of operation, all of which will become apparent in the description in detail hereinafter, especially in connection with the combination therewith of the slack-adjuster, in order that the limited treadle range of motion will be maintained substantially constant, as well as the features of the compound boost, to make possible attaining high brake line pressures, even in the case of failure of the power source.

With reference to Fig. 2, the brake control plunger 32 has a valve closing seat 38 formed at the right end thereof, for engagement and closure of an outlet valve 39, seen in the "off" position in the drawings. A work chamber 40 communicates with an exhaust passage 41, radial holes 42 and annular groove 43 in an end housing extension 44 of an end housing 45, which has inlet 46 and outlet 47 connections for inlet of hydraulic pressure fluid and return of hydraulic fluid, respectively, to which pipes 48 and 49, Fig. 1, are connected by any usual pipes, the former having a constant pressure regulator valve (see Fig. 4). An inlet chamber 50 is formed in a boss 51 on the end housing 45, which communicates with an annular chamber 52 formed in the end housing 45 by way of a check valve fitting 53 having a light spring 53a and a synthetic rubber valve 53b vulcanized to a stem 53c having a snap ring 53d for taking the reaction of the valve return spring 53a. The inlet chamber 50 is closed by a closure nut 54 having a gasket seal 54a. In the case of use thereof with an automatic transmission the outlet 47 connects to the reservoir of the transmission (not shown).

The outlet 47, furthermore, communicates with an exhaust chamber 55 formed in a boss 56 on end housing member 45 and which is closed by a nut 57 and gasket 57a. This chamber 55 also communicates with the annular groove passage 43 by a passage 58 and by a passage 59 leading to the work chamber 40 by way of a check valve and fitting 60 which is identical in structure to the before mentioned valve fitting 53 and valve 53b in the inlet chamber 50. There is also an additional communication to the discharge chamber 55 by way of the passage 58, comprising a snifter bleeder valve 61 having a screw-threaded seat member 61a adapted to be inserted through a plugged hole 61b. It will be noted that a valve-retaining cavity 61c and bleeder orifice are located at the highest point of the passages leading to the work chamber 40 and so that the snifter bleeder valve 61 is normally away from its seat 61a in order that any air which may be occluded in the oil will escape. As soon as there is the slightest flow of liquid oil, the snifter valve 61 will close, and if for any reason a vacuum is produced in the work chamber 40 the check valve in the fitting 60 will permit fluid to flow into the chamber 40 from the exhaust chamber 55.

A power boost cylinder tube 62 is held in place in the housing 45 and hermetically sealed at one end by a seal ring 63 and by an annular flange 63a. Centrally spaced from the outside of the tube 62 there is another tube 64, forming part of an accumulator housing, which is guided by and sealed by an annular boss 65 and a seal ring 66. The right hand ends of the tubes 62 and 64 are held in place and sealed in a similar manner by flanges 67 and 68 formed on a master cylinder housing 69, having a breather opening 69a. There are four long bolts 70, two of which are shown in Fig. 1, for holding together the complete assembly of the booster unit including supporting brackets 71. Suitable nuts and lock washers 72 are provided on the bolts, as indicated in Fig. 1. The brackets 71 have drilled holes 71a for locating the unit substantially in line with lever arm 16 and push rod 31, and adapted for mounting on the automobile frame.

In the annular space between the cylinders 62 and 64 there is mounted an annular flexible endless tube of synthetic rubber 73, held in place by a valve stem 74 having therein the usual tire inflation valve, with a retaining nut and a washer seal 75 and 75a, respectively, as well as a valve cap 75b. According to the pressure requiremtnt, this accumulator tube 73 is inflated to a specified pressure. In the case of operation in connection with an automatic transmission, the tube 73 may be inflated to about one half the minimum pressure available from the transmission pump system. This accumulator 73 follows generally the teaching in my Patent No. 2,418,667 aforesaid, with the difference that the booster cylinder 62 is arranged to deliver fluid to a booster piston within the confines of the accumulator, and the input of pressure fluid is around an end plate 76 supported on one end of the cylinder 62. At the other end thereof there is an end plate 76a fastened to suitable bosses 76b, one of which is shown in Fig. 2A, with a screw 76c. The plate 76 may be similarly held in place. The pressure fluid will flow from the annular space 52 around the inner circumference of the plate 76, as indicated by an arrow 77. This flow area is preferably maintained at the minimum so that there will not be any undue stress on the accumulator tube 73 when the tube is inflated, as the end plates 76 and 76a confine the tube when not supported by incoming pressure fluid. To this end discharge holes 78, in the cylinder 62, are made small in a series equally spaced radially.

It will be noted that a power booster piston 79, located in the cylinder 62, in some respects follows the teachings of my Patent No. 2,311,576 aforesaid, except for the modulator valve portion which is generically the same as the valve in my Patent No. 2,505,578 aforesaid. However, there are additional and different elements and functions over the said patents which I will describe hereinafter in connection with the operation of the booster portion of my invention.

The booster piston 79 is provided with two apposed lip seals 80 and 81, made of a rubber substitute compound suitable for resisting the oil used in fluid pressure systems, and I preferably use a form of seal 82 having its heel portion retained in an undercut recess, which prevents extension of the heel into the clearance fit between the piston 79 and cylinder 62 for attaining a low friction. Between these seals 80 and 81 there is a chamber 83 movable with the piston 79 for providing communication by way of an annular series of radial holes, two of which are indicated at 84 and 85, and through a valve seat groove 86 and thence by an annular valve slot 87, comprising a synthetic rubber valve 88 backed up by a thin brass ring 89, for supporting the valve. A light coil spring 90 and snap ring 91 retain the valve normally shut, but permit the flow of the pressure fluid therethrough to a valve chamber 92 and by a valve 95 which normally seats on a removable seat member 95a located in a bore of the piston 79.

It will be noted that a modulator valve stem 93a has a counterbalancing piston portion 94 having a sliding seal ring 94a at the right end and a tapered valve 95 at an intermediate portion and the valve head 39 at the left end. These valves 39, 95 together form a modulator or self-lapping valve means. The sectional areas of the valve head 39, valve 95 and its seat and piston portion are substantially all the same so as to provide a hydraulic balance. See my Patent No. 2,505,578 aforesaid. However, this valve differs in the combination with the booster piston 79 and in the provision of a substantial cylinder chamber 93, which provide a continued movement of the valve stem 93a after the annular check valve 88 closes and the pressure in the work chamber 40 is no longer acted on by the power pressure fluid, but is continued to a higher pressure by subsequent movement of the manual means by the displacement of the plunger 32, which it will be noted has an effective area equivalent to its diameter less the area of the balance section of the valve stem 93a. It will also be noticed that there is a central restricted small hole 96, which in normal operation communicates the low pressure discharge pressure to the interior of the valve 95 leading to the displacement volume chamber 93 and the counterbalancing piston 94 in order to maintain the desired hydraulic balance of the valve. However, upon a fast application this restriction 96 will impede the flow due to the displacement of the piston 94 in the cylinder chamber 93, which effectively prevents brake-shock during fast applications, by increasing the proportion of the manual foot force to the output force. I preferably use two springs 96a and 96b, the former being lighter and the latter being substantially greater in rate but normally of a length not to be effective initially. This gives easy initial power cut-in but after which the stronger spring 96b will counterbalance a push-back spring 103, hereinafter referred to. A closure plug 97 and a seal 98 are provided in the piston 79 and a snap ring 99 holds the plug 97 in the end of the bore of the valve piston cylinder while the plug further acts as an abutment for bearing against a master cylinder plunger 100, which extends into a master cylinder 101. At the right end thereof the plunger 100 has riveted thereto a combined spring retainer and compensater valve disc 102, provided with a push-back spring 103, having as low a rate such as is consistent for the return of the plunger rod 100 and piston 79. For example, a force of 8 to 10 lbs. at the normal extended position of the piston is sufficient, inasmuch as the seals are all well lubricated.

There is, also, an assembly of a guide bushing 104 retained in the master cylinder housing cylinder 101 which holds in place a cup seal 105 having a back-up washer 106 retained by a ring 107 and a snap ring 108. At this junction there is an opening 109 leading to a master cylinder replenishing reservoir 110. A standard shaft leather seal retainer cup 111 is held in place by a retainer washer 112 and snap ring 113. A seal 112a surrounds the retainer in a groove of the housing at this point.

A tipping compensating valve 114 has a rubber seat 115 vulcanized thereon, in order that the valve will seal off when the plunger 100 is moved to the right initially, which will guide a valve stem 114a thereon to swing into a vertical position. This action permits a spring 116 to close the valve 114 and thus close a passage 117 leading to the reservoir 110, but will permit replenishing of the cylinder 101 if a negative pressure is present for pumping up the system. The valve 114, spring 116, with a snap ring retainer 118, and a nut 119, which is sealed by a gasket 120, hold the assembly in place in the reservoir housing.

It will be apparent that the booster may be applied with an ordinary low range treadle if desired by any desired means of control and, also, the power source could be with any suitable fluid pressure and the parts could be arranged to have different dimensions than those shown, according to the power output requirements. The particular combination shown, however, has special application to passenger automobiles in connection with the power source available in automobile transmissions of the types currently in use and to this end a novel combination is disclosed herein, with an improved booster apparatus, as well as novel features of hydraulic impulse systems and control systems comprising senders and receivers.

For instance, while the pressure regulation valve shown in Fig. 4 is generically similar to the valve shown in my Patent No. 2,636,511 aforesaid, there are certain important features of improvement over said early patent.

Furthermore, in the place of the usual residual pressure check valve currently used in master cylinders, I use a slack-adjuster which is in general like that in my Patent No. 2,593,192 aforesaid, but in this present invention I provide a differential bore formed by a first cylinder 121 in the master cylinder housing 69, having a restricted orifice 122, and a second cylinder 123, centrally located in a counterbore 125 and fastened securely to the master cylinder housing 69 by four screws, two of which are shown at 124. An annular space 126a around a slack adjuster differential piston 126 has a breather passage 126b leading to the reservoir 110. It will be noted that the bore of the second cylinder 123 is slightly smaller in diameter than the cylinder 121, whereby when the differential piston 126 is advanced, there will be a portion of the force available to hold the piston 126 to the right and open a valve 127 by means of a valve stem 126c being forced against a perforated stop plate 127a, against the action of a piston return spring 128 and a valve return spring 129, which will, in its extended position, be compressed and the valve 127 held open against a spring-retainer cup 130 located against a snap ring 130a on the valve stem 126c. This cup 130 is loosely guided in a counterbore of the piston 126, having a stop shoulder 131. The second cylinder 123 has a closure nut fitting 132, adapted to receive a tube fitting 132a for a brake tubing 132b, leading to front and rear wheel cylinders 132c, as indicated in Fig. 1, of the vehicle brakes.

With reference to the alternative form of the control valve shown in Fig. 4, in this instance a check valve fitting 133 and check valve 133a are mounted in a constant pressure regulator plunger 134 and the threads and nut portion thereof are reversed as compared to those shown in Fig. 2. A valve housing 135 therefore is made to replace the closure member 51 in Fig. 2, and contains an inlet for pressure fluid 135a, having a valve seat insert 136 and a seal ring 136a in a groove therein. The valve stem of the plunger 134 slides in a bore 137, sealed by a ring 137a, and has a tapered valve 137b to seat on the valve seat insert 136.

Beyond the valve 137b there is a recess 138 and a counterbalance piston 139 having a seal ring 139a. The bore 137 and valve seal bore in the insert 136 have the same dimensions whereby a hydraulically balanced valve is secured with respect to the pressure fluid inlet. There are four radial holes 140 through the wall of the valve stem of the plunger 134 into an interior bore 141, and it will be apparent that pressure fluid during its delivery will have to overcome the spring tension of a check valve spring 142 on the check valve 133a and that this force will be added to the force holding the valve 137b open. There is another force holding the valve open, that is to say, from an adjusting spring 143, which normally holds the valve 137b open in the stop position maintained by a stop washer 144, held in place by the adjusting spring 143. As soon as the flow stops the valve 133a will seat and it will be seen that this valve in the seated position will give up the spring force that had previously been acting on the valve stem and that, the pressure of the inlet being unbalanced, the valve 137b will close because the pressure trapped in the accumulator will counterbalance the adjusting spring 143. Thus, the location of the check valve spring 142 acting in a direction to open the valve 137b during flow, distinguishes it from my Patent No. 2,636,511 aforesaid, in which the check valve spring force always acts in the direction to close the control valve. This is an important improvement in this invention, making for chatter-free operation and a differential to hold closed the control valve 137b when the flow is stopped at the time of cut off of the control pressure. An adjusting nut 145 is screw-threaded into the valve housing 135 and is provided with a suitable lock nut 146, having a vent 144a.

For emergency, a second long range pedal 147, operable by the left foot, having a fixed pivot 148 on the automobile frame and attached by a pin 149 to a slotted clevis 150, may be provided, said clevis being adjustably screw-threaded to a ling 151 on the lever 16. A stop 154 on the bracket 10 limits the movement of the pedal 147. A suitable pull-back spring 152 is provided between the support 10 and the lever 147 to hold the pedal 147 against the stop 154 and to maintain a slight lost-motion connection with the pedal 147, to permit the lever 16 to make a slight clockwise rotation when the accelerator toe portion 26 is being depressed.

In the operation of my invention, it is assumed that the booster unit is installed on a passenger automobile, and that the unit is connected to the brake system having lines leading to the brake cylinders 132c on the front and rear wheel brakes 155, 156, 157 and 158, respectively. In the case where the front brakes 155 and 156 have larger brake actuator cylinders than the rear brakes 157 and 158, the brake shoe-pull-backspring 155a and 156a on the front brakes will have an increased force in accordance with the ratio of the areas in the front and rear cylinders so that the retraction brake line pressure will be substantially equal for all the wheel cylinders, which is especially desirable in connection with the slack-adjuster action.

In Figs. 1 and 2, it will be considered that the output 48 of the pressure fluid is tapped into the pressure source of the automatic transmission and will be maintained substantially constant by the constant pressure regulator valve 48a indicated diagrammatically in Fig. 1. Thus, this pressure will be received in the accumulator of an order preferably of 35 to 40 p.s.i.

Figure 3:
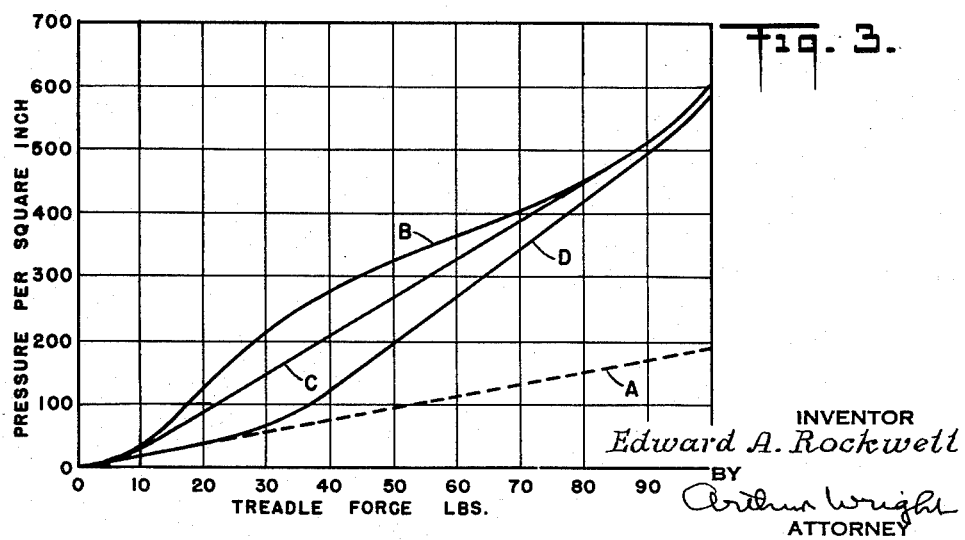
Fig. 3 is a typical graph of the performance characteristic of the booster unit.

It is assumed, for example, that the wheel brake receivers or motors 132c require a pressure of about 600 p.s.i., to completely lock the wheels under normal conditions and that for this level of pressure a treadle force of 100 lbs. is required, it is understood that these pressures can be altered somewhat by dimensional changes if desired, the figures being given by way of example only. Such an example of performance characteristic is shown on the chart in Fig. 3, in which the brake line p.s.i. to the receivers is plotted against treadle force in lbs.

Curve A is the theoretical characteristic assuming straight manual force being directly to the plunger 100. B is a curve taking into account the opposing spring forces in the application of pressure from a pressure source which theoretically varies above that controlled by the constant pressures available from an automatic transmission of such systems having a pressure, for example, in the order of 90 p.s.i. The curve B has the reduced regulated pressure run-out indicated at some point, herein for example, at curve C. The curve D shows the late "cut-in" in case of no power application for the manual compound boost.

It is of importance that even in the case of substantially variable pressures from the power source, the characteristic will be substantially the same as to pressures, except that the treadle will travel towards its maximum travel, and in the case with higher pressures from the source there will be more travel reserve, i.e., a shorter range of travel. The parts having been proportioned for the output requirements, the regulator valve, in maintaining a constant pressure, will thus maintain a more constant travel range than if the regulator were not present. However, it will be understood that the regulator valve could be eliminated to save additional cost where desired.

Force exerted upon the treadle 25 to operate the brakes will first cause the outlet valve 39 to close, and further actuation will open the valve 95, which will instantly apply pressure to the work chamber 40, closing the snifter valve 61, and this pressure will act on the left end of the power piston 79, to apply pressure to move the master cylinder plunger 100 to the right against the resistance of the spring 103. The slightest movement permits the compensation valve 114 to seat and, thus, the plunger 100 will advance to force hydraulic fluid through the orifice 122, and act to move the differential piston, assembly 126, against the force of the relatively light spring 128 until the valve stem 126c abuts against the stop plate 127a, at which time the valve 127 will open. The clearance between the right end of the valve stem 126c and the stop plate 127a is a predetermined measured minimum clearance volume for engagement and release of the brake shoes 155, 156, 157, 158, at a point where there will be no appreciable drag of the brake shoes against their drums in release. At the time the valve 127 is open, continued increase of pressure will deliver fluid under an increasing rate of pressure for the requirements of the service range of operation.

During this action, the pressure admitted by the valve 95 into the chamber 40 will resist the treadle force in proportion to the effective area of the plunger 32, and, of course, the manual work of operating the plunger 32 will be added to the work of the power piston by reason of the fact that at this stage of operation the valve action is such as to follow up the lap position of the valves 39 and 95, especially since the stiffer of the two valve springs will tend to increase the manual force applied and the power pressure will enter the work chamber 40 fast enough to tend to close the valve 95.

Upon run-out of the power, further movement of the pedal and actuating plunger 32, while it maintains the self-lapping valve means, including the poppet valve 95, open, is no longer effective to provide an increased pressure behind the power piston. Upon this condition occurring the valve 84 closes to trap fluid in the chamber which is thus defined behind the power piston, and the actuating plunger 32 itself applies pressure to the fluid trapped in this chamber, which increased pressure is effective to move the power piston and, through the output plunger 100, apply increased pressure to the brake fluid in the lines leading to the system. Thus the actuating piston is operated by continued movement of the pedal after run-out to apply pressure to the power piston, and it is observed that effective areas of the actuating plunger 32, the braking cylinder piston 100, and the power piston 79, are larger, respectively, whereby the manual force on the pedal is hydraulically multiplied. The relationship between these effective areas may be established such that the desired second stage boost ratio is obtained. Therefore, the pressure in the master cylinder and wheel brake cylinders will simply follow the curve of the pressure developed by the power, at the particular manual pressure. Since the brakes have been substantially set with considerable force, the travel will not be excessive at this time. With this action it can be seen that with the combination of the adjusting device the sequence of operation will be substantially the same even where the brake linings wear.

It will be apparent that with the short range pedal brake travel, now so much in demand, that the dual boost and adjustment for wear combined with limited power in the initial stage of operation produces a very desirable result because in case of failure of the power source the maximum pressures can be attained safely without undue pedal force being at the top range. Naturally, the lower range will require greater ranges of manual force than normally, but at least the automobile can be safely stopped, see curve D, Fig. 3.

At the present time the pedal ranges are so short that it requires application of power to make a safe stop, as the manual forces would be very high otherwise, but the long range pedal 147 aids therein.

It will further be apparent that the limited power necessary at the initial stages added to the manual work requires a small displacement of the pressure fluid. Therefore, all the parts can be assembled in a much smaller unit making for easy installation. Also, the drain of pressure fluid from the transmission at any time is not sufficient to cause malfunction of the automatic transmission. And it is not necessary, thus, the furnish a separate pumping system for the brake system. Also, the usual two pumps comprised in the transmission system make for a dependable source of pressure, better than where vacuum is used, as in current systems now using a vacuum.

The vehicle so equipped, for instance, can be towed as the rear pump is functioning, or at any other time the engine is dead. Furthermore, the oil pressures are more accurately controllable by the manual means than in the case of vacuum braking systems due to solid pressure transfer of forces.

While I have described my invention above in detail I wish it to be understood that many changes may be made therein without departing from the spirit of the same.

I claim:

1. In a pedal operated booster for a brake system, said system having lines filled with brake fluid and leading to the brakes, a master cylinder having a piston for applying pressure to the fluid in the lines and a source of pressure differing from the atmosphere, the booster providing a two-stage boost including a first stage power boost until the pressure limit of the source or run-out is reached and a second stage manual hydraulic boost after run-out, the combination comprising: a fluid motor having a power piston connected to said master cylinder and operative in the power boost stage for applying pressure to the brake fluid in the lines, means including a self-lapping valve connected to said source and coupled to said pedal for establishing and incrementally increasing a differential pressure to operate said power piston upon successive increments of pedal movement until run-out is reached; and means for obtaining boost after run-out in the second stage of operation, including an actuating plunger operatively connected to said pedal and operated by continued movement of the latter after run-out so as to increased the differential pressure acting on said power piston, the effective areas of the actuating plunger master cylinder piston and power piston being larger, respectively, whereby the manual force on the pedal is hydraulically multiplied to obtain the second stage boost.

2. In a pedal operated booster for a brake system, said system having lines filled with brake fluid and leading to the brakes, a master cylinder having a piston for applying pressure to the fluid in the lines and a source of pressure differing from the atmosphere connected to supply power to the booster, the booster providing a boost ratio between the pressure of the brake fluid in the lines and the manual force applied to the brake pedal, the combination comprising: a power unit having a power piston operatively connected to said master cylinder and effective to develop a power boost upon movement of the pedal, until the pressure limit of the source or run-out of power; means including a self-lapping valve movable by the pedal for controlling application of pressure from said source to said power piston, for establishing and incrementally increasing a differential pressure to operate said power piston upon successive increments of pedal movement until run-out; and means including an actuating plunger for said piston operated by the pedal and a valve responsive to said differential pressure for trapping fluid between said power piston and said actuating plunger so that said actuating plunger is operated by continued movement of the pedal after run-out of the power to apply pressure to said trapped fluid to move the power piston, the relative effective areas of the actuating plunger, master cylinder piston, and power piston being larger, respectively, whereby the manual force on the pedal is hydraulically multiplied after run-out so as to obtain the desired boost ratio.

3. In a pedal operated booster for a brake system, said system having lines filled with brake fluid and leading to the brakes, a master cylinder for applying pressure to the fluid in the lines and a source of pressure differing from the atmosphere, the booster providing a boost ratio between the pressure of the brake fluid in the lines and the manual force applied to the brake pedal; the combination comprising: a power unit connected to said master cylinder so as to develop power boost at a given boost ratio upon movement of the pedal until (a) the power runs out when the pressure limit of the source is reached or (b) the power fails, said power unit including a fluid motor for operating said master cylinder to apply pressure to the brake fluid in the lines, and means including a self-lapping valve movable by the pedal for controlling the application of pressure from said source to said fluid motor, for establishing and incrementally increasing a differential pressure to operate said motor upon successive increments of pedal movement until run-out; and a booster for obtaining boost after run-out of power including an actuating plunger operated by said pedal and valve means having an element shiftable responsive to said differential pressure (a) when the power runs out or (b) when the power fails, for trapping fluid between said power piston and said actuating plunger so that the latter operated by continued movement of the pedal after run-out increases the differential pressure acting on said power piston, the effective areas of the actuating plunger, master cylinder piston, and power piston being larger, respectively, whereby the force on the pedal is hydraulically multiplied after run-out so as to obtain a boost at substantially the same boost ratio.

4. In a pedal operated booster for a brake system, said system having lines filled with brake fluid and leading to the brakes, a master cylinder for applying pressure to the fluid in the lines, and a source of pressure differing from the atmosphere, the booster providing a boost ratio between the pressure of the brake fluid in the lines and the manual force applied to the brake pedal; the combination compriisng: a power unit effective to develop power boost upon movement of the pedal until (a) the power runs out when the pressure limit of the source is reached or (b) the power fails, said power unit including a fluid motor for applying pressure to the brake fluid in the lines, and means including a self-lapping valve movable by the pedal for controlling the application of pressure from said source to said fluid motor, for establishing and incrementally increasing a differential pressure to operate said motor upon successive increments of pedal movement until run-out; and a booster for obtaining boost after run-out of power including an actuating plunger connected to the pedal, and valve means responsive to said differential pressure, including a valve shiftable (a) when the power runs out or (b) when the power fails, for trapping fluid between said power piston and said actuating plunger so that the latter is effective to apply pressure to said trapped fluid upon continued movement of the pedal after run-out, the effective area of the actuating plunger, master cylinder piston, and power piston being larger, respectively, whereby the force on the pedal after run-out is hydraulically multiplied so as to obtain the same boost ratio as before run-out.

5. In a power unit of the character described, adapted for operation by a brake pedal, a casing, a hydraulic connection on the casing for a brake line for conducting brake fluid to a hydraulic wheel brake, a second connection on the casing adapted to receive hydraulic pressure fluid from a source for the power operation of the unit, a master cylinder for developing a controlled hydraulic pressure conducted to the wheel brake by means of said hydraulic connection for the operation of the latter, a power piston for operating the master cylinder, means including a self-lapping valve device for controlling the pressure of fluid applied to the power piston from said source via said second connection, an actuating member for operating said valve device, said valve device being arranged to closely follow said actuating member providing an early cut-in of the power, means including a one way check valve between said power piston and said second connection and arranged to trap fluid applied to said power piston upon run-out of power, and a plunger operated by said pedal and connected to increase the pressure on the entrapped fluid after run-out, to obtain a manual hydraulic boost.

6. In a pedal operated two-stage booster for a brake system, the combination comprising, a casing having a longitudinal cylinder defined therein, a fluid motor in the cylinder in said casing including a power piston slidable in the cylinder, a master cylinder mounted on one end of the casing and having a piston for applying pressure to brake fluid in the master cylinder and forcing the same into the system, means connecting said master cylinder piston to said power piston, a closure member for the casing at the said one end and arranged to slidably receive the master cylinder piston, means defining a hydraulic accumulator chamber in said casing surrounding said cylinder, a second closure member for the other end of said casing, an actuating plunger coupled to the pedal and slidably received in said second closure member axially of said power piston, self-lapping valve means including a movable valve element subjected to accumulator pressure and supported by said power piston axially of said actuating plunger, said valve element being normally urged towards its seat to cut off communication between said accumulator and said power piston, means connecting said valve element and said actuating plunger for establishing and incrementally increasing a differential pressure on opposite sides of the power piston upon pedal movement in the first power boost stage until the pressure limit of the source or run-out is reached; and means including a valve responsive to said differential pressure for trapping fluid between said actuating plunger and said power piston after run-out, said actuating plunger being operated by continued movement of the pedal after run-out to apply an intensified pressure on the entrapped fluid and thereby increase the differential pressure acting on said power piston, the effective areas of the actuating plunger, master cylinder piston, and power piston being larger, respectively, whereby the manual force on the pedal is hydraulically multiplied after run-out to obtain a desired second stage boost.

7. In a pedal operated booster for a brake system, a casing defining a cylinder, an output plunger extending from one end of the casing, a power piston in the cylinder having a bore therein, said power piston being connected to said output plunger, means in said casing defining a hydraulic accumulator surrounding said cylinder, means including a closure member at the other end of said casing defining a chamber on one side of said piston, means connecting said accumulator and said chamber via the bore in said power piston, a poppet valve mounted in one end of the bore in the said power piston and subjected to accumulator pressure, means normally urging the poppet valve against its seat to seal off the chamber behind said piston from the accumulator pressure, an actuating member slidably received in said closure member for operating said poppet valve to urge the same in a direction away from its seat thereby to admit pressure fluid from the accumulator into said chamber to operate the piston, means including a plunger connected to said actuating member for increasing the pressure of fluid in said chamber after run-out, and valve means responsive to said last-named pressure for preventing reverse flow to the accumulator.

8. In a pedal operated two-stage booster for a brake system, a casing defining a cylinder, an output plunger extending from one end of the casing, a power piston in the cylinder having a bore therein, said power piston being connected to said output plunger, means in said casing defining a hydraulic accumulator and chamber therefor surrounding said cylinder, a passage for pressure fluid connecting said accumulator and said bore on one side of the piston, means including a closure member at the other end of said casing defining a chamber on the opposite side of said piston to said passage and connected to said accumulator by said bore and passage, a poppet valve in said bore in the said power piston and normally spring-urged against its seat to seal off the chamber behind said piston from the passage, an actuating member slidably recevied in said closure member for operating said poppet valve to urge the same in a direction away from its seat therby to admit pressure fluid from the accumulator to said piston chamber to operate the piston, means including a plunger connected to said actuating member for increasing the pressure of fluid in said piston chamber after run-out, and valve means responsive to said last-named pressure for preventing reverse flow to the accumulator.

9. In a pedal operated two-stage booster for a brake system, a casing defining a cylinder, an output plunger extending from one end of the casing, a power piston in the cylinder having a bore therein, said power piston being connected to said output plunger, means in said casing defining a hydraulic accumulator and chamber surrounding said cylinder, a passage for pressure fluid connecting said accumulator and said bore on one side of the piston, means including a closure member at the other end of said casing defining a chamber on the opposite side behind said piston, a valve head in the bore and means defining a valve seat therefor, said valve head being normally urged against its seat to seal off the chamber behind said piston from the accumulator pressure, an actuating member slidably received in said closure member for operating said valve head upon pedal movement in the first stage of operation to urge the same in a direction away from its seat thereby to admit pressure from the accumulator behind said piston to operate the same, means including a plunger connected to said actuating member for increasing the pressure of fluid in said piston chamber after run-out, and a one-way check valve responsive to said last-named pressure and arranged to cut off communication and reverse flow through said passage, said actuating plunger being operated in the second stage of operation by continued movement of the pedal after run-out.

10. In a pedal operated two-stage booster for a brake system, a casing defining a cylinder, an output plunger extending from one end of the casing, a power piston in the cylinder having a bore therein, said power piston being connected to said output plunger, means in said casing defining a hydraulic accumulator and chamber therefor surrounding said cylinder, means including a closure member at the other end of said casing defining a chamber behind said piston, a poppet valve in said bore in the said power piston and subjected to accumulator pressure, means normally urging the poppet valve against its seat to seal off the chamber behind said piston from the accumulator pressure, a longitudinal passage through said poppet valve and communicating with a closed chamber at one end, said closed chamber being normally filled with fluid from said accumulator, and an actuating member slidably received in said closure member for operating said poppet valve to urge the same in a direction away from its seat and into said closed chamber thereby to admit pressure from the accumulator behind said piston to operate the same, said longitudinal passage through the poppet valve having a restriction and a connection at the other end to discharge fluid from said closed chamber upon application of the pedal, said restriction impeding the flow of fluid through said passage effectively limiting brake shock and movement of said poppet valve.

11. In a power unit of the character described, adapted for operation by a brake pedal, a hydraulic connection on the unit for a brake line for conducting brake fluid to a hydraulic wheel brake, a second connection on the unit adapted to receive from a source, pressure fluid at a pressure differing from atmosphere for the power operation of the unit, a master cylinder for developing a controlled brake fluid pressure for the operation of the wheel brake, a power piston for operating the master cylinder means including, a pedal operated self-lapping valve device for controlling the application of pressure fluid from said source to the power piston of the unit via said second connection, said valve device being arranged to closely follow the movement of said pedal providing an early cut-in of the power and application of the same to operate said piston until the pressure limit of the source or run-out of power is reached, means including a one-way check valve connecting the power piston and the source and arranged to prevent reverse flow and thereby isolate fluid acting on said piston at the pressure extant upon run-out, and means including an actuating plunger connected to said pedal and effective to apply an intensified pressure on the isolated fluid upon continued movement of the pedal after run-out to operate said power piston and obtain a manual hydraulic boost.

12. In a pedal operated booster for a brake system, a casing defining a cylinder, an output plunger extending from one end of the casing, a power piston in the cylinder, said power piston being connected to said output plunger, means in said casing defining a hydraulic accumulator surrounding said cylinder, means including a closure member at the other end of said casing defining a chamber on one side of said piston, a passage connecting said accumulator and said chamber, a poppet valve mounted in said passage and normally spring urged against its seat to seal off the chamber behind said piston from the accumulator, an actuating member slidably received in said closure member for operating said poppet valve to urge the same in a direction away from said seat so as to admit pressure from the accumulator into said chamber to operate the piston, valve means between said accumulator and said poppet valve for preventing reverse flow after run-out thereby trapping fluid in said chamber, and means including a plunger operated by said actuating member and mounted in said chamber so that continued movement of the pedal after run-out causes said plunger to increase the pressure of the trapped fluid in said chamber.

References Cited in the file of this patent
UNITED STATES PATENTS

| | | |
|---|---|---|
| 1,907,009 | Rockwell | May 2, 1933 |
| 2,287,301 | Freeman | June 23, 1942 |
| 2,300,136 | Rockwell | Oct. 27, 1942 |
| 2,304,560 | Freeman | Dec. 8, 1942 |
| 2,328,684 | Schnell | Sept. 7, 1943 |
| 2,457,721 | Price | Dec. 28, 1948 |
| 2,517,005 | MacDuff | Aug. 1, 1950 |
| 2,544,042 | Pontius | Mar. 6, 1951 |
| 2,573,277 | Rockwell | Oct. 30, 1951 |
| 2,593,192 | Rockwell | Apr. 15, 1952 |
| 2,642,165 | Banker | June 16, 1953 |
| 2,657,777 | Smith | Nov. 3, 1953 |
| 2,758,684 | Stickel | Aug. 14, 1956 |
| 2,766,732 | Schultz | Oct. 16, 1956 |
| 2,796,737 | Harger | June 25, 1957 |